Nov. 12, 1935.  E. E. ARNOLD ET AL  2,020,927
DRILL STEM WEIGHT MEASURING DEVICE
Filed Jan. 14, 1933   3 Sheets-Sheet 3

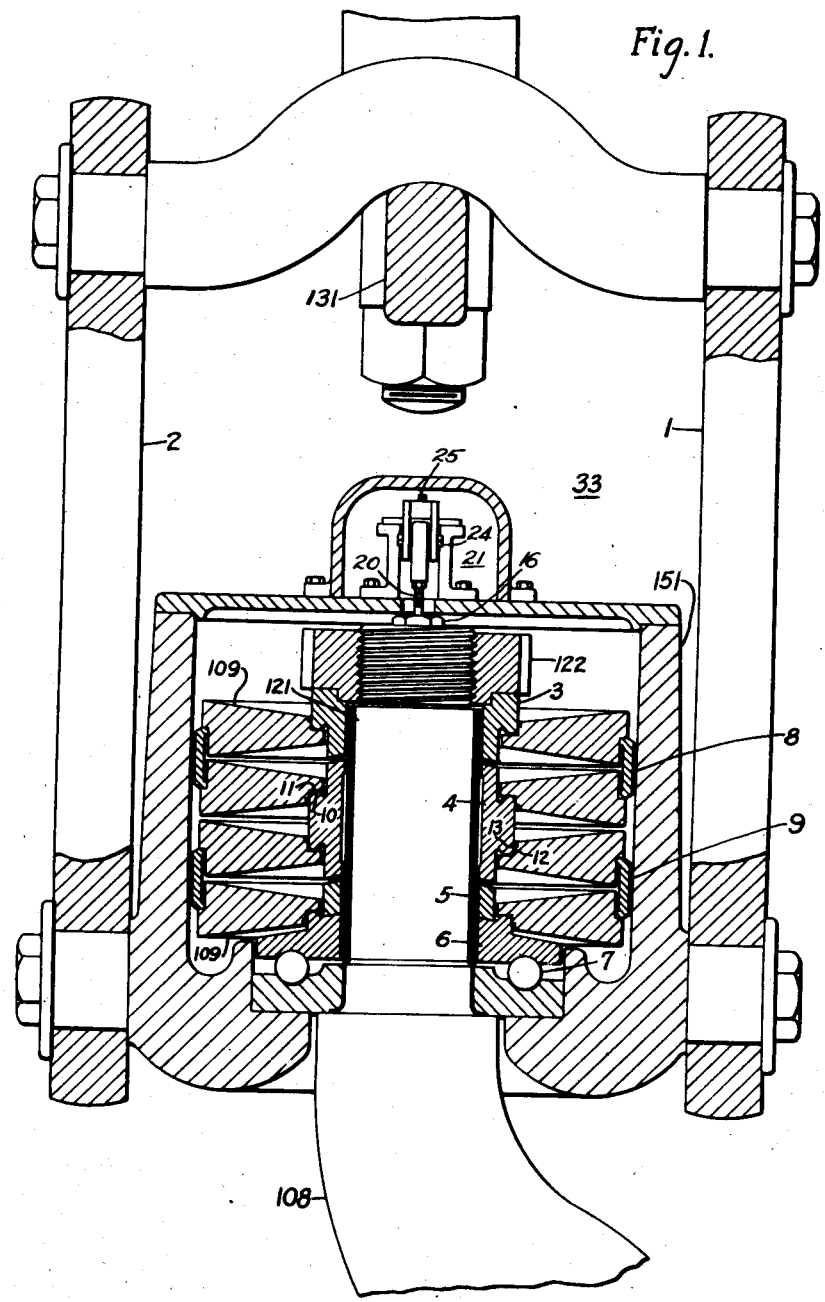

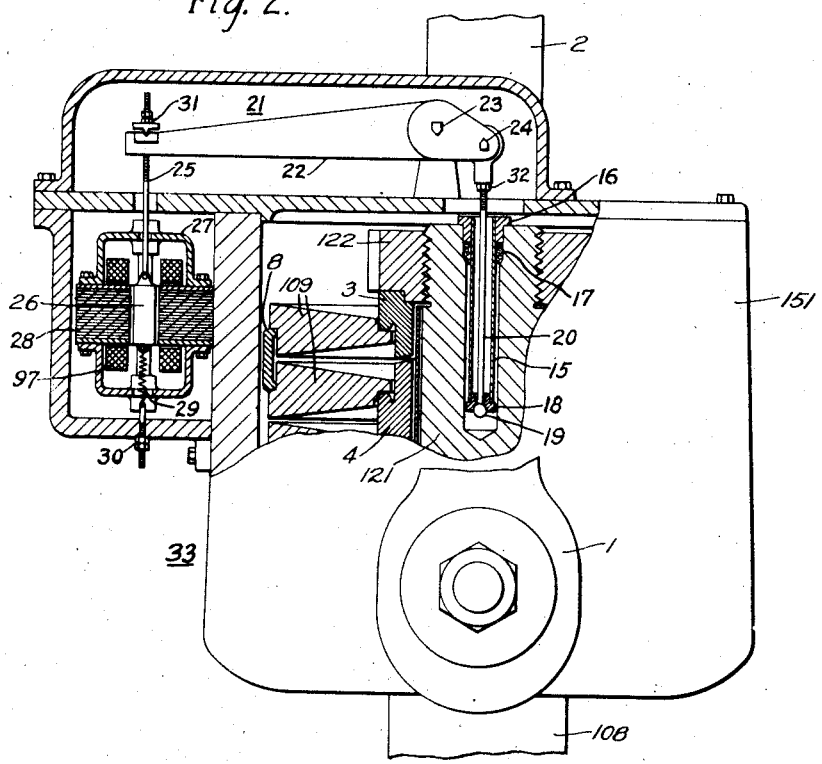
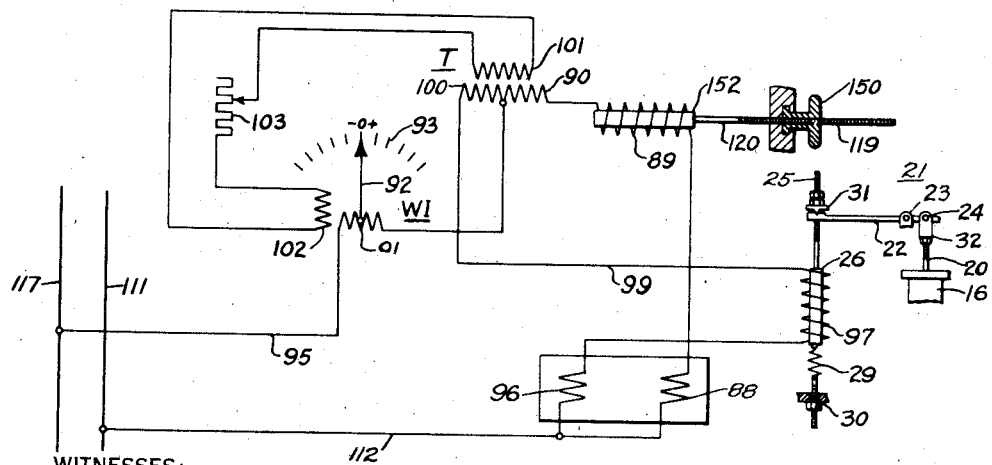

WITNESSES:
Leon J. Taza
Paul E. Friedemann

INVENTORS.
Edwin E. Arnold and
Arthur M. Wahl.
BY
M. R. Coley
ATTORNEY

Patented Nov. 12, 1935

2,020,927

UNITED STATES PATENT OFFICE 2,020,927

DRILL-STEM WEIGHT MEASURING DEVICE

Edwin E. Arnold, Pittsburgh, and Arthur M. Wahl, Wilkinsburg, Pa., assignors to Westinghouse Electric & Manufacturing Company, East Pittsburgh, Pa., a corporation of Pennsylvania Application January 14, 1933; Serial No. 651,668

6 Claims. (Cl. 267—1)

This invention relates to a weighing device of particular utility for weighing the drill stem of a deep well drilling equipment or for weighing bodies similarly having great weight.

Various attempts have heretofore been made to indicate or measure the weight of objects by the provision of devices utilizing helical or similar springs. Such devices invariably embody indicating means, and deflection multiplying means, directly responsive to the weight being measured. When great weights are to be measured, such devices become enormous in size, the bearing surfaces for the system of levers necessary are a source of wear and introduce considerable error in the measurement, and are expensive.

One of the objects of this invention is to provide a simple, compact, relatively small, practical, inexpensive, and above all, accurate means for measuring the weight of relatively heavy objects.

In the art of deep well drilling the weights involved may amount to several hundred-thousand pounds whereas in practice the average weight of the drilling tool on the bottom of the well is about ten-thousand pounds and may even be considerably less. Furthermore, a variation of five thousand pounds may cause the drill stem to be twisted off. Yet a variation of five thousand pounds where, say two hundred and fifty thousand pounds are involved, is but a relatively small variation. Any ordinary device for weighing the drill stem is thus not of value in the art.

It is an object of this invention to provide for accurately weighing great weights so that a variation of a small fraction of one percent of the total weight is accurately indicated.

A further object of this invention is the provision of electro-mechanical means for directly indicating the weight of an object without such means being directly subjected to the weight of the object.

A still further object of this invention is to provide for electrically measuring the weight of an object.

Other objects and advantages will become apparent from a study of the following specification when done in conjunction with the accompanying drawings, in which:

Figure 1 is a sectional view, along a vertical plane, of the invention showing the general assembly and the details of the disc springs forming part of this invention;

Fig. 2 is a sectional view, along a vertical plane at right angles to the plane of section for Fig. 1, showing the details of the mechanical multplying device and the magnetic transmission mechanism of this invention;

Fig. 3 is a diagram of the circuit connections for the electromagnetic portion of this invention; and, Figs. 4, 5 and 6 show details of three other modifications of the disc springs and their supporting structures.

Figure 4:
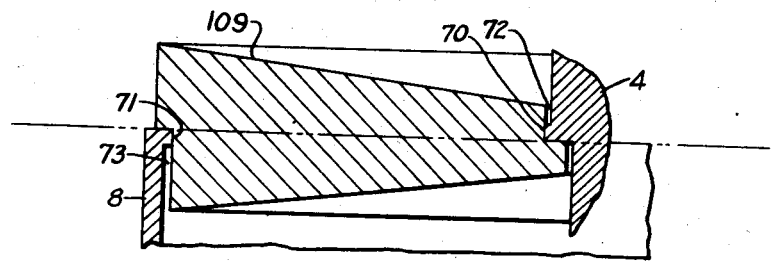

A travelling hook 131 is disposed to support the weight responsive device 33 and the weight, and may be secured, through a block and through suitable cables or chains passing over the crown block of a well drilling rig, to the hoist drum, or may be secured to a beam of a hoist crane, or the boom of an ambulatory crane, to a winch, or to any other device where a weight-indicating mechanism may be needed.

The weight responsive device 33 embodies a casing 151, a hook 108 having a shank 121, a nut 122, and a plurality of disc springs 109. These springs may, in some instances, be slightly dished. In Fig. 1 four discs are shown but where a great deflection is expected more than four discs may be used. Since the entire weight of the heavy object to be weighed is to be supported by the discs or disc springs, these springs are designed to be very rugged and, in consequence, even great variations in the weight of the object being weighed will not produce very appreciable deflections but each deflection will nevertheless represent an accurate proportional response to a change in weight.

The casing 151 of the weight responsive device 33 is supported by the links 1 and 2 at the lower portion of the casing, and the hook 108, acting through the stem 121 and the nut 122, acts upon the disc springs 109 when a weight is supported by the hook 108. The discs 109 are held in spaced relation by the spacing rings 3, 4 and 5. The spacing ring 3 is in direct engagement with the nut 122 whereas the ring 5 is in direct engagement with the race 6 of the ball bearing 7.

A second pair of spacing rings 8 and 9 is disposed along the outer periphery of the springs so that any force exerted by the nut 121 through the ring 3 on the uppermost spring is transmitted to the next spring below it. The sum of the weights thus carried by the spring represents the total deflection of the stem 121 which deflection is a measure of the weight supported on the hook 108.

In order that the deflection may be directly proportional to the weight supported by the hook the respective discs are so designed at the inner periphery thereof that they rest upon a curved surface 10. The bearing surface chosen for the respective discs embodies a flat portion 11 engaging the curved portion 10, this flat portion being chosen at the neutral axis plane of the disc spring, that is, the horizontal plane along which no distortions occur when the spring is deflected because of the weight acting upon it. It is thus apparent that for any vertical deflection, each spring will merely rotate on the corresponding surface 10 and there will be no distortions or additional stresses established in the respective springs because of any binding that might occur at the point of contact between the springs and the spacing rings. Further, each of the springs 109 is provided with a lug portion 12 engaging a straight portion 13 on the respective spacing rings, so that as vertical movement of the central portions of the discs occurs, the discs will be guided along the cylindrical surface of the spacing rings, and thus will be held in proper relation with regard to the inner spacing rings and the outer spacing rings. Successive action of the weight responsive device will thus not impair the accuracy of the deflection in its correspondence with the variations in the load supported by the hook 108.

The arcuate portions 10, the guiding lugs 12 on the disc springs 109 an the guide surface on the spacing rings, coupled with the fact that the contact area is in the neutral plane of the spring, reduces friction. The contact stresses are thus kept within desired limits and unnecessary lateral movement of the rings with regard to the discs is prevented so that for repeated and oscillatory operation the calibration of the weight responsive device cannot vary, and furthermore, the deflection is directly proportional to the variations in weight supported by the hook 108.

It will be noted from an inspection of Fig. 1 that no curved surfaces are shown at the point of engagement between the rings 8 and 9 and the respective dished disc springs 109. For many installations the particular arrangement shown in Fig. 1 is sufficiently accurate, in fact for some installations the outside rings 8 and 9 and the inside rings 4, 5, etc. may be constructed as shown in Fig. 4.

In this figure, it will be noted that the contact between the disc spring 109 and rings 4 and 8 respectively, is still in the neutral plane and the rings themselves are provided with guide surfaces 70 and 71, respectively. It will be noted that the ring 4 and the ring 8 have cutout portions 72 and 73, respectively. It is thus obvious that as a force is exerted upon the ring 4 in the downward direction the disc 109 will be guided on the surfaces 70 and 71 and the distortions in the rings will not be considerable due to the fact that flat, non-rolling, surfaces are provided between the rings 4 and 8 and the spring 109.

Figure 5:
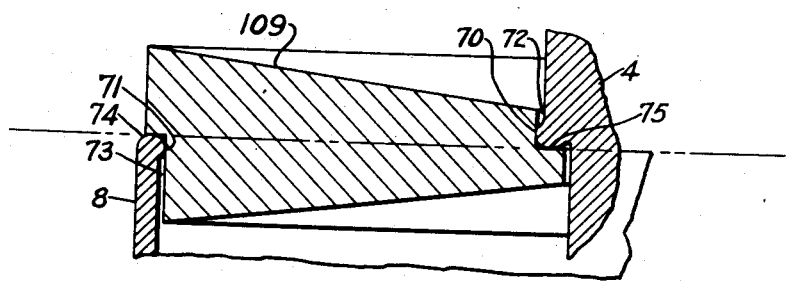
Figure 6:
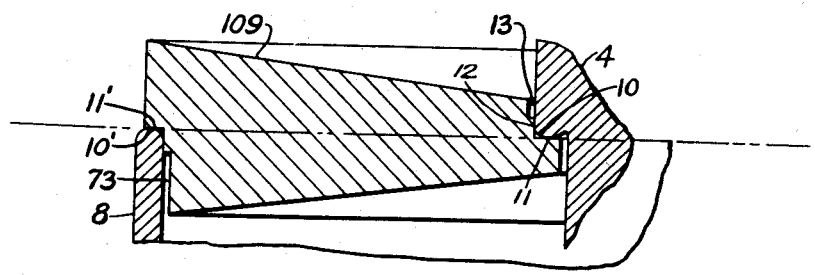

For a somewhat more accurate operation, in fact the most sensitive devices made, the modifications shown in Figs. 5 and 6 are provided. It will be noted that the ring 8 in the modification shown in Fig. 5 is provided with a curved surface 74 and a cutout portion 73 and the ring 4 is provided with an arcuate surface 75 and a cutout portion 72. When a considerable force is applied to the ring 4 in the downward direction, and all the contact forces act on the neutral planes of the discs, the discs will be caused to roll on the surfaces 74 and 75 so that the sensitivity of the disc to variations in force applied to the ring 4 is increased. Again the rings 4 and 8 are provided with guide surfaces 70 and 71 to prevent bending stresses and improper positioning of the disc spring 109. It will be noted that the disc springs have no more machined or cutout surfaces in the modification shown in Fig. 5 than in the modification shown in Fig. 4, so that from the standpoint of cost of manufacture the modification shown in Fig. 5 is not very much more expensive than the modification shown in Fig. 4.

In some cases, the guide surfaces, as well as the arcuate surfaces, may be placed on the disc itself, however, such structure is no more sensitive than the structure shown in Fig. 6, or for that matter, Fig. 5, where the arcuate surfaces 10 are provided on the rings 4 and 8, respectively, but the guide surfaces are positioned on the discs themselves.

It should be noted that the showing in the modification of Fig. 6 so far as the rings 4 and the inner periphery at the disc 109 are concerned, the structure seen is that shown in Fig. 1, but at the outer rings 8 an arcuate surface 10' is provided so that each disc when deflected may roll upon the arcuate surface at the outside as well as on the arcuate surface 10 on the inside.

For all modifications, particularly where heavy objects that do not vary in weight a great deal are being weighed, the discs are dished upwardly by an amount so that the normal weight of the object deflects the discs just sufficiently to remove the dished effect. The weight indications are thus made more accurate.

From the foregoing discussion, it is obvious that some effective means for accurately measuring the small deflections caused by the weight would be an accurate indication or measurement of the weight supported by the hook. To this end, the stem 121 is provided with a ferrule 15 along its axis, which ferrule is rigidly held in the stem by a screw 16 and stuffing box 17. At the lower portion of the ferrule a bearing 18 is provided. This bearing, coupled with the ball 19 on the stem 20, constitutes a ball and socket joint 40 for the mechanical multiplying device 21, comprising the stem 20, the pivoted lever 22, pivoted at 23. The stem 20 is pivoted on the lever 22 at 24 so that the right-hand end of the lever 22 will move over a considerable distance for a small deflection caused by the weight on hook 108.

To further multiply the movement of the disc springs 109, the lever 22 is adjustably secured to rod 25, operating an armature 26 cooperating with a variable magnetic circuit 27—28. The armature 26 is biased towards a lower position by spring 29, the tension of which may be adjusted by the spring adjusting means 30. It should be noted that the rod 25 is provided with adjusting means 31 and that the rod 20 is also provided with adjusting means 32, whereby the instrument may be properly adjusted and the initial calibration may be materially aided.

This invention is of particular utility where great weights are being weighed and where the weight of the object being weighed is known to be somewhere in the neighborhood of say 200,000 lbs. and may vary from this weight by 20,000 lbs. In this instance the various adjusting means above referred to are adjusted so that the indicator 92 cooperating with the graduations 93 will indicate how much more or how much less the object weighs than the weight for which the instrument was adjusted. That is, if the indicator 92 is adjusted to be in the zero position, as shown, that position will be the position indicating 200,000 lbs.

Any change in weight of the object being weighed will thus change the reactance in the coil 97 cooperating with the magnetic circuit 27—28. The change of reactance may thus be a measure of the weight of the object. Since accurate calibration of the instrument WI cannot be very readily done by the mechanical adjusting means above referred to, a reactor coil 89 is provided with an armature 152 which may be suitably adjusted by the manually operable knob 150 cooperating with the threads 119 on the stem 128. With a known weight on the hook 108, the necessary adjustments are made by the adjusting means 30, 31 and 32 and the hand-operated knob 150 is then shifted to vary the reactance of reactor coil 89 until the pointer 92 takes the position shown in Fig. 3.

The circuit for these coils may be traced from the energized conductor 111 through conductor 112, coil 96, reactor coil 97, conductor 99, primary winding 100 of the transformer T, movable coil 91 of the weight indicator WI and conductor 95 to the energized conductor 117. Another circuit is established from the energized conductor at 112 through coil 88, adjustable reactor coil 89 and primary winding 90 of the transformer T, to the movable coil 91 of the weight indicator WI. The stationary coil 102 of the weight indicator WI is energized from the secondary winding 101 of the transformer T. A variable resistor 103 is connected in the circuit of the stationary winding 102 and the secondary winding 101 to control the relative effect of the stationary winding 102.

The weight measuring device WI has its scale 93 calibrated to read in pounds or tons, as the case may be, by which the weight of the object being weighed deviates from the original calibration when a known weight was utilized. The coils 88 and 96 for many applications represent the coils of a regulator not forming part of this invention, but are shown in the diagram illustrating this invention merely since it is desirable to have impedances in the circuits of the coils 97 and 89 respectively, which are not affected by any movement of the iron cores 152 and 26, associated respectively with coils 89 and 97.

It is, of course, readily understood that the mechanical multiplying device 21 consisting, as shown, of a pivoted lever 22, may in fact embody a plurality of pivoted levers mounted in a suitable housing and supported on well-machined bearings, so that the final indication made by the instrument WI will not be affected by any mechanical factors embodied in the mechanical multiplying device.

From the foregoing discussion, it should be apparent that this invention embodies an electro-mechanical device for indicating the weight of relatively heavy objects and indicating such weight with an accuracy not heretofore attained. Furthermore, this invention discloses a type of spring support for the object being weighed which not only is instrumental in weighing the object, but also provides a certain resiliency between the supporting members constituting the hooks 131 and 108. Further, the weight indicating device is itself not directly subjected to the weight of the object being weighed. The movement of the rod or stem 20 is merely a measure of the weight and this movement is taken advantage of through suitable mechanical multiplying devices and electro-mechanical and electromagnetic indicating devices which are in themselves designed to be accurately calibrated, so that any variation in the weight of the object being weighed is readily and accurately indicated by the instrument WI.

Further, the disc springs in the arrangement shown, form a very compact and rugged means for supporting the object being weighed and constitute a device, responsive to the weight, that is much more compact, simpler, and also cheaper than any devices for such purposes heretofore known in the art.

From the foregoing explanation, it is readily apparent that those skilled in the art, after having had the benefit of the teachings contained in the foregoing disclosure, may devise weight indicating and measuring devices falling within the spirit of this invention. This invention, therefore, is not to be limited to the specific details contained in the foregoing specification and illustrated in the accompanying drawings, but is to be limited only by the pertinent prior art and the scope of the claims hereto appended.

We claim as our invention:

1. A spring system comprising a plurality of radially tapered slightly dished annuli, floating spacing rings engaging the outer periphery of successive pairs of said annuli and in the neutral plane surface thereof, spacing rings engaging the inner periphery of staggered successive pairs of said annuli and also in the neural plane thereof, the contact surfaces between said spacing rings and the annuli being designed to be rolling when the annuli are distorted.

2. A spring system comprising an annulus having an outer and an inner supporting peripheral ledge in the neutral plane thereof.

3. A spring system comprising a plurality of stacked annular members, means for operatively connecting successive pairs of said members at their outer peripheries and in their respective neutral planes, and means for operatively connecting staggered successive pairs of said members at their inner peripheries and in their respective neutral planes.

4. A spring system comprising a plurality of stacked annular members severally having outer and inner ledges in the respective neutral planes thereof, spacing rings for connecting successive pairs of said members at said outer ledges, and spacing rings for connecting staggered successive pairs of said members at said inner ledges.

5. A spring system comprising a plurality of stacked annular members, means for operatively connecting successive pairs of said members at their outer peripheries and in their respective neutral planes, and means for operatively connecting staggered successive pairs of said members at their inner peripheries and in their respective neutral planes, at least one of the contact surfaces between said means and the annular members being designed to be rolling when the annular members are distorted.

6. A spring system comprising a plurality of stacked annular members severally having outer and inner ledges in the respective neutral planes thereof, spacing rings for connecting successive pairs of said members at said outer ledges, and spacing rings for connecting staggered successive pairs of said members at said inner ledges, at least one of the contact surfaces between said rings and said ledges being designed to be rolling when the annular members are distorted.

EDWIN E. ARNOLD.
ARTHUR M. WAHL.